(12) United States Patent
Gordon

(10) Patent No.: US 7,258,178 B2
(45) Date of Patent: Aug. 21, 2007

(54) AUGER PLANTER

(75) Inventor: Glenn Gordon, Largo, FL (US)

(73) Assignee: Gordon Laboratories, Inc., Largo, FL (US)

( * ) Notice: Subject to any disclaimer, the term of this patent is extended or adjusted under 35 U.S.C. 154(b) by 86 days.

(21) Appl. No.: 11/269,110

(22) Filed: Nov. 8, 2005

(65) Prior Publication Data

US 2007/0102169 A1    May 10, 2007

(51) Int. Cl.
*E21B 10/44* (2006.01)
*A01B 1/00* (2006.01)
*A01C 5/02* (2006.01)

(52) U.S. Cl. ............... 175/394; 175/323; 111/116; 172/532; 172/111; 172/25

(58) Field of Classification Search ............... 175/394, 175/385, 323; 111/116; 172/111, 532, 25, 172/41, 378, 21, 540
See application file for complete search history.

(56) References Cited

U.S. PATENT DOCUMENTS

| 3,175,630 | A | * | 3/1965 | Hein et al. ............... 175/386 |
| 3,444,940 | A | * | 5/1969 | Thomas et al. ............ 175/394 |
| 4,807,710 | A | * | 2/1989 | Greeley .................... 175/394 |
| 5,067,571 | A |   | 11/1991 | Niewold et al. |
| 6,161,625 | A | * | 12/2000 | Mati ........................ 172/96 |

* cited by examiner

*Primary Examiner*—Kenneth Thompson
*Assistant Examiner*—Shane Bomar
(74) *Attorney, Agent, or Firm*—Dennis G. LaPointe

(57) ABSTRACT

An auger planter for forming small holes in the earth for the planting of flower bulbs, plant seedlings and plants, and for the insertion of termite monitors and baits. The auger includes a central shaft and a single helical flighting having its leading edge configured to have a sickle blade shape with a cutting edge. The opposite end of the flighting has a portion which is directed in an essentially vertical orientation proximating an alignment parallelling the axis of shaft.

5 Claims, 3 Drawing Sheets

AUGER PLANTER

FIELD OF THE INVENTION

The invention relates to auger planters for use in planting plants, flower bulbs, plant seedlings and termite monitors and baits.

BACKGROUND OF THE INVENTION

The inventor herein has used commercially available auger planters but has found several problems with the reliability and performance of the available devices. The inventor found circumstances where the flighting would break off the shaft, or the device was not effective with cutting encountered heavy roots, or its performance was not impressive in dense soils like clay and when breaking through rocky ground. The objective of the present invention is to provide an auger planter that would solve or minimize the above encountered problems.

SUMMARY OF THE INVENTION

The invention is an auger planter for forming small holes in the earth for the planting of flower bulbs, plant seedlings, plants, termite monitors and baits, and the like. The auger includes a central shaft and a single flighting having its leading edge configured to have a sickle blade shape with a cutting edge that can be easily sharpened with a tool such as a hand held rat-tail file, a grinding wheel or the like. The opposite end of the flighting has a portion which is directed in an essentially vertical orientation proximating an alignment parallelling the axis of shaft. This upward bend of the end of the flighting portion facilitates keeping the dirt from being flung in a substantial wide pattern away from the hole. That is, it keeps the dirt traveling along the flighting on the flighting and generally in front of the upwardly directed portion of the flighting, thereby keeping any flung dirt relatively close to the perimeter of the bored hole. This help ensure neatness around the hole which is desired when installing terminate monitors or baits such as those devices described in U.S. Pat. No. 5,899,018 to the inventor herein.

The sickle shape on the bottom end was found to cut exceptionally very well through heavy roots, provided improved performance in denser soils (like clay), and was very effective in breaking through rocky ground.

In addition, although spaced-apart welding of the flighting to the shaft is suitable, it is preferred that the flighting be substantially welded to the shaft generally from its bottom to its top. Another preferred embodiment is that the leading end of the shaft have a tapered end.

Another embodiment is directed to the distal end of the shaft which has a portion of the shaft which is engaged by a power tool drill. This end is adapted in size to fit various desired power tools such as ⅜ inch or ½ inch drills. The present invention is intended to be used with any power drill, including cordless drills, electrical cord drills, and gas drills. In a preferred embodiment, the cross-sectional shape of the power tool engaging portion, instead of being round, should be polygonal shaped, for example, square, hex or octagonal shaped.

An auger planter incorporating the above features when used, exhibits minimal eccentric orbital rotation and minimizes inadvertent injury to the user.

DETAILED DESCRIPTION OF THE INVENTION

Figure 1:
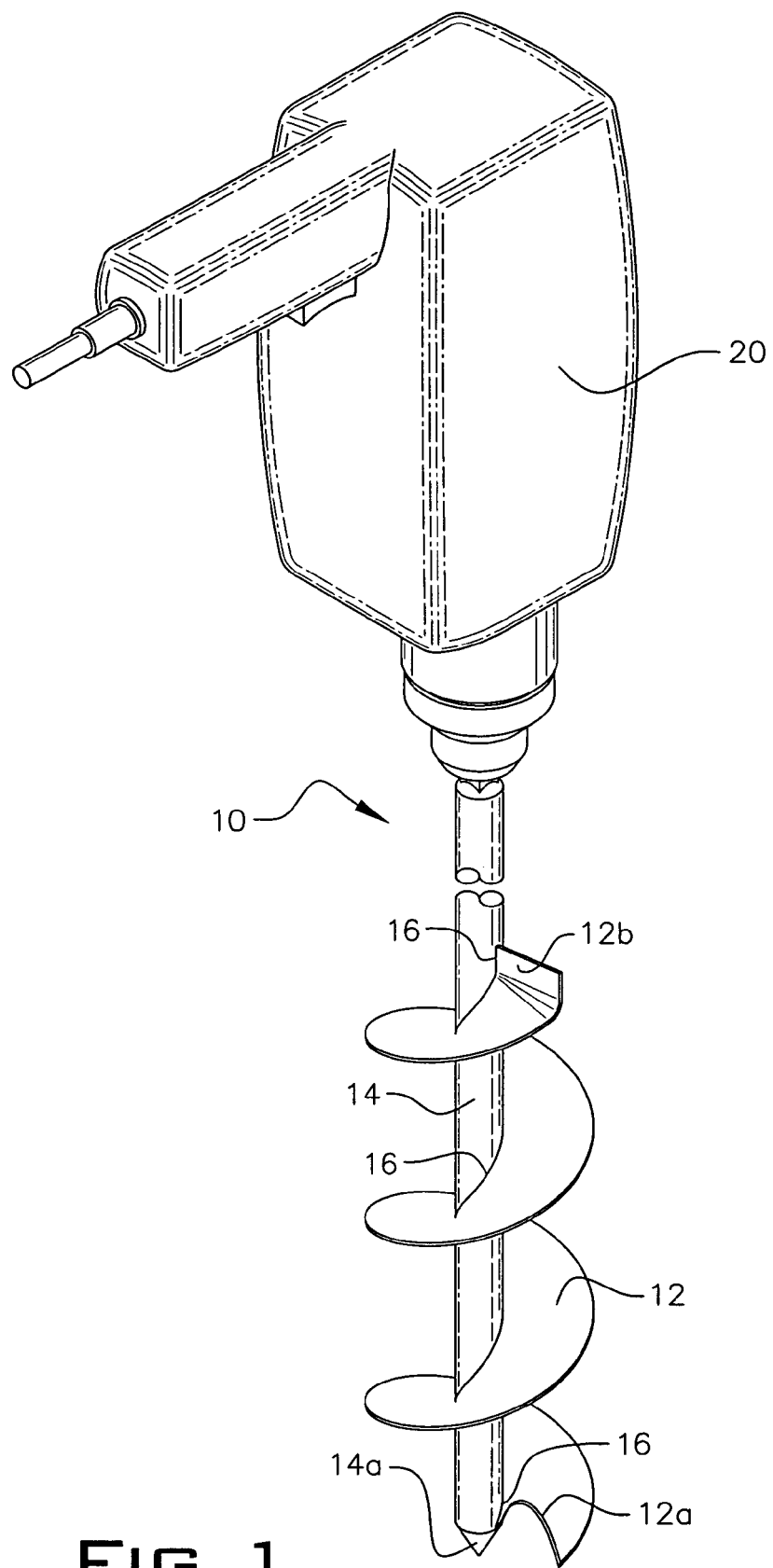
FIG. 1 is a perspective view of the present invention mounted to a power drill.
Figure 2:
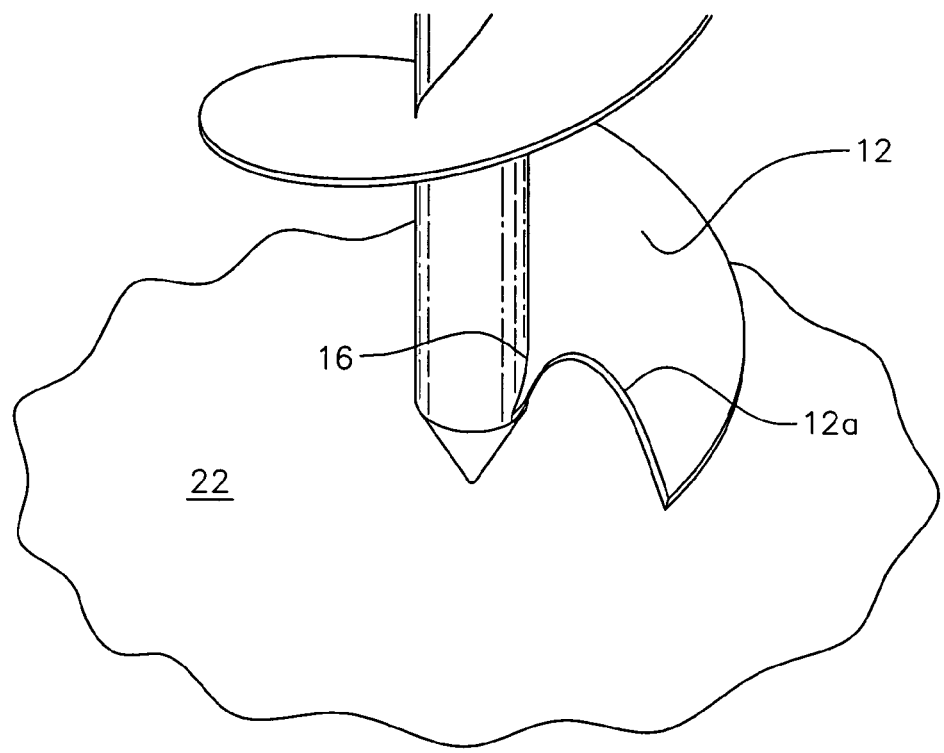
FIG. 2 is a partial view of the leading end of the present invention being aligned for drilling a hole in the soil.
Figure 3:
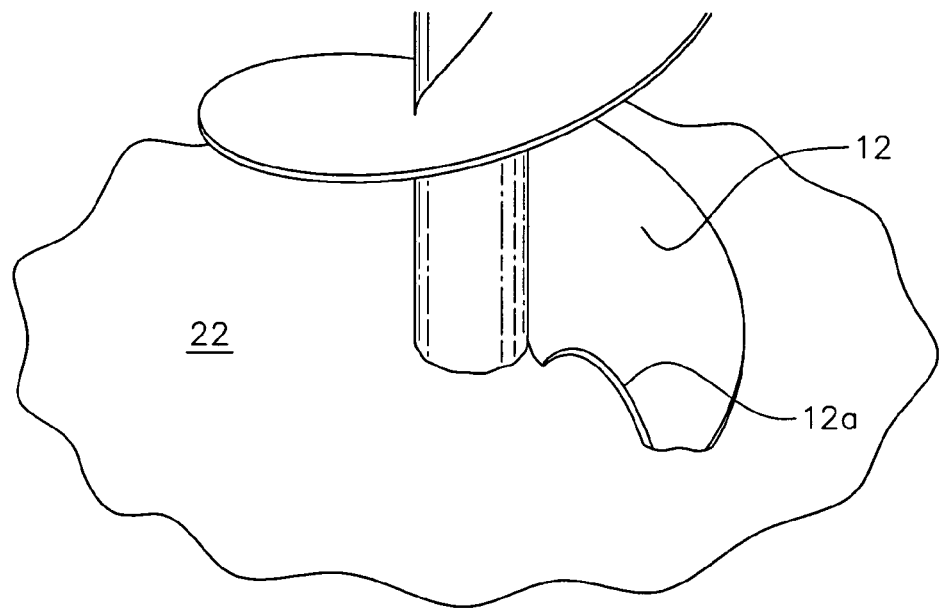
FIG. 3 is a partial view similar to FIG. 2 depicting the leading end of the auger beginning its bore into the ground.

FIG. 1 is a perspective view of the present invention 10 mounted to a power drill 20.

Figure 4:
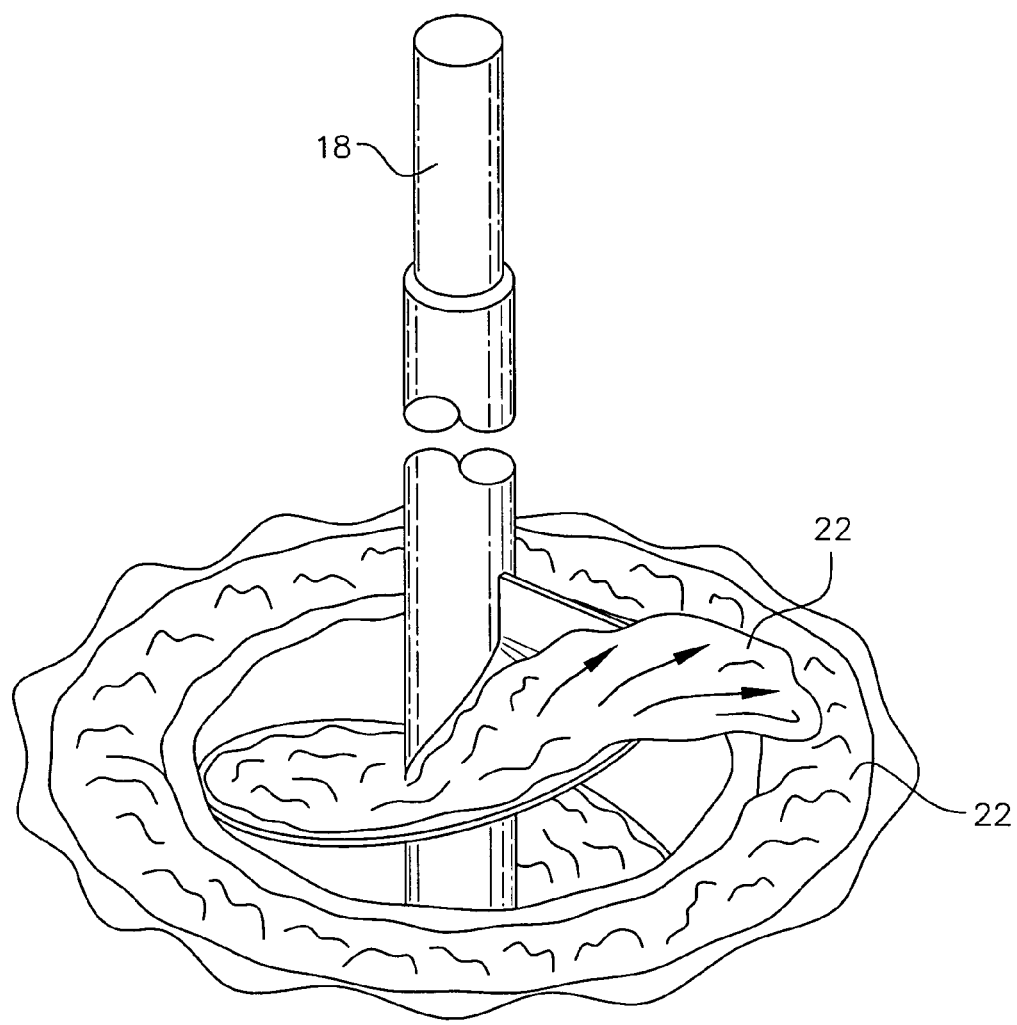
FIG. 4 is a perspective conceptual drawing depicting (with the drill removed) the trailing end of the flighting as the boring operation is nearly complete.

The invention is an auger planter 10 for forming small holes in the soil 22 for the planting of flower bulbs, plant seedlings, plants, termite monitors and baits, and the like (not shown). The auger 10 includes a central shaft 14 and a single helical flighting 12 having its leading edge configured to have a sickle blade shape 12a with a cutting edge that can be easily sharpened with a tool such as a hand held rat-tail file, a grinding wheel or the like. The opposite end of the flighting 12 has a portion 12b which is directed in an essentially vertical orientation proximating an alignment parallelling the axis of shaft 14. This upward bend portion 12b of the end of the flighting facilitates keeping the dirt 22 from being flung in a substantial wide pattern away from the hole. As shown in FIG. 4 (see arrows), the dirt is pushed generally forward in front of the upwardly directed portion 12b so as to more effectively distribute the dirt 22 exiting the bored hole in a relatively neat pattern close to the hole perimeter. This portion 12b may extend upwardly from about ⅜ inch to about 1 inch and extends substantially entirely across the flighting 12 on one side of the shaft 14. This help ensure neatness around the hole which is desired when installing terminate monitors or baits such as those devices described in U.S. Pat. No. 5,899,018 to the inventor herein.

The sickle shape portion 12a on the bottom end of the flighting 12 was found to cut exceptionally very well through heavy roots, provided improved performance in denser soils (like clay), and was very effective in breaking through rocky ground.

In addition, although spaced-apart welding of the flighting 12 to the shaft 14 is suitable, it is preferred that the flighting 12 be substantially welded at weld joint 16 to the shaft 14 generally from its bottom to its top. Another preferred embodiment is that the leading end of the shaft have a tapered end 14a. Typically, these tapers are about 25 to 45 degrees.

Figure 5:
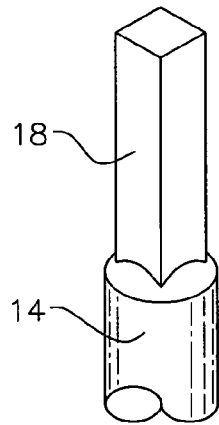
FIG. 5 is a conceptual depiction of an example of a drill engagement portion of the auger where the drill engagement portion is square-shaped.
Figure 6:
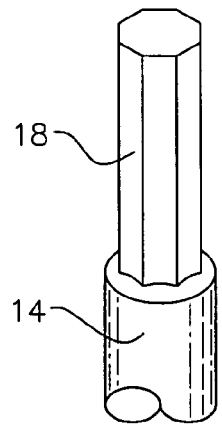
FIG. 6 is a conceptual depiction of another example of a drill engagement portion of the auger, where the drill engagement portion is hex-shaped.
Figure 7:
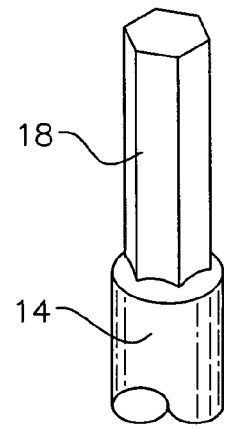
FIG. 7 is a conceptual depiction of another example of a drill engagement portion of the auger, where the drill engagement portion is octagonal-shaped.

Another embodiment is directed to the distal end of the shaft 14 which has a portion 18 of the shaft 14 which is engaged by a power or hand held drill 20. This portion 18 is adapted in size to fit various desired drilla such as ⅜ inch or ½ inch drills. In a preferred embodiment, the cross-sectional shape of the power tool engaging portion 18, instead of being round as in FIG. 4, should be polygonal shaped, for example, square-shaped as in FIG. 5, hex-shaped as in FIG. 6 or octagonal-shaped as in FIG. 7.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. An auger planter for forming small holes in the earth for the planting of flower bulbs, plant seedlings and plants, and for the insertion of termite monitors and baits, the auger planter comprising:
   a single helical flighting for advancing into the soil and a central shaft extending substantially axially through said helical fighting;
   a leading end of said shaft being tapered to form a generally pointed cone;
   a leading edge of said flighting being configured to form a sickle blade shape having a cutting edge;
   an opposite end of said flighting continuing in an upward direction to form an essentially vertical oriented portion of said flighting proximating an alignment paralleling an axis of said shaft; and
   the shaft further having a drill engagement portion at an end extending beyond the essentially vertical oriented portion of said flighting.

2. The auger planter according to claim 1, wherein the flighting is welded to the shaft.

3. The auger planter according to claim 2, wherein the flighting is welded to the shaft generally from its bottom to its top.

4. The auger planter according to claim 1, wherein said essentially vertical oriented portion of the flighting extends substantially entirely across said flighting on one side of the shaft.

5. The auger planter according to claim 1, wherein the drill engagement portion has a cross-section that is circular-shaped or polygon shaped.

* * * * *